US012611873B2

(12) United States Patent
Florez et al.

(10) Patent No.: US 12,611,873 B2
(45) Date of Patent: Apr. 28, 2026

(54) MARKING METHOD AND MARKED RECEPTACLE

(71) Applicant: AIRNOV, INC., New Castle, DE (US)

(72) Inventors: Mark Florez, Los Lunas, NM (US); Valere Logel, Levallois Perret (FR); Randy Powell, Albuquerque, NM (US)

(73) Assignee: AIRNOV, INC., Wilmington, DE (US)

( * ) Notice: Subject to any disclaimer, the term of this patent is extended or adjusted under 35 U.S.C. 154(b) by 179 days.

(21) Appl. No.: 17/997,054

(22) PCT Filed: Apr. 30, 2021

(86) PCT No.: PCT/EP2021/061404
§ 371 (c)(1),
(2) Date: Oct. 25, 2022

(87) PCT Pub. No.: WO2021/219850
PCT Pub. Date: Nov. 4, 2021

(65) Prior Publication Data

US 2023/0166529 A1 Jun. 1, 2023

(30) Foreign Application Priority Data

Apr. 30, 2020 (EP) .................................... 20172340

(51) Int. Cl.
*B41J 2/44* (2006.01)
*B41J 2/45* (2006.01)
(Continued)

(52) U.S. Cl.
CPC ............. *B41J 3/4073* (2013.01); *B41J 2/442* (2013.01); *B41J 2/45* (2013.01); *B41J 2/455* (2013.01);
(Continued)

(58) Field of Classification Search
CPC ..... B41J 2/44; B41J 2/442; B41J 2/447; B41J 2/45; B41J 2/455; B41J 2/471;
(Continued)

(56) References Cited

U.S. PATENT DOCUMENTS 5,736,616 A 4/1998 Ching et al.
8,617,128 B2 12/2013 Kimmel
(Continued)

FOREIGN PATENT DOCUMENTS

CN 1068306 A 1/1993
CN 101658979 A 3/2010
(Continued)

OTHER PUBLICATIONS

International Search Report with Written Opinion of the International Searching Authority, dated Jul. 30, 2021, with respect to International Application No. PCT/EP2021/061404.
(Continued)

*Primary Examiner* — Douglas X Rodriguez
*Assistant Examiner* — Kendrick X Liu
(74) *Attorney, Agent, or Firm* — Scott R. Cox

(57) ABSTRACT

A method for marking of a receptacle while it is moved along a conveying path, including:
moving the receptacle in a marking station along the conveying path; and
simultaneously marking a first surface region and a second surface region of the receptacle while it is moved in the marking station along the conveying path, using a first laser beam and a second laser beam emitted in opposite directions on both sides of the receptacle, transversally to a conveying direction of the receptacle, wherein the first and second surface regions are arranged substantially at 180° from each other with respect to a main axis of the receptacle.

21 Claims, 3 Drawing Sheets

(51) Int. Cl.

| | |
|---|---|
| ***B41J 2/455*** | (2006.01) |
| ***B41J 2/47*** | (2006.01) |
| ***B41J 2/475*** | (2006.01) |
| ***B41J 3/407*** | (2006.01) |

(52) U.S. Cl.
CPC ............. *B41J 2/473* (2013.01); *B41J 2/4753* (2013.01); *B41J 3/40733* (2020.08)

(58) Field of Classification Search
CPC . B41J 2/473; B41J 2/475; B41J 2/4753; B41J 3/4073; B41J 3/40733
See application file for complete search history.

(56) References Cited

U.S. PATENT DOCUMENTS

| | | | | |
|---|---|---|---|---|
| 8,677,721 | B2 | 3/2014 | Piana | |
| 10,071,582 | B2 | 9/2018 | Brehm et al. | |
| 11,772,197 | B2 | 10/2023 | Lee et al. | |
| 2002/0140567 | A1 | 10/2002 | Crawley et al. | |
| 2003/0102289 | A1 | 6/2003 | Nissels et al. | |
| 2005/0218126 | A1 | 10/2005 | Leyvraz | |
| 2007/0285488 | A1* | 12/2007 | Ishimi | G02B 26/105 347/179 |
| 2012/0264207 | A1* | 10/2012 | Sharpe | A01N 1/0268 435/307.1 |
| 2013/0300816 | A1* | 11/2013 | Kueckendahl | B41J 2/45 347/245 |
| 2014/0224778 | A1* | 8/2014 | Armbruster | B23K 26/0608 219/121.68 |
| 2014/0253661 | A1* | 9/2014 | Armbruster | B23K 26/355 347/225 |
| 2018/0239565 | A1* | 8/2018 | Yamamoto | B41J 2/475 |
| 2018/0339524 | A1* | 11/2018 | Sawamura | B41J 2/4753 |
| 2021/0387906 | A1 | 12/2021 | Ollivier et al. | |

FOREIGN PATENT DOCUMENTS

| | | | |
|---|---|---|---|
| CN | 102357736 | A | 2/2012 |
| CN | 102773609 | A | 11/2012 |
| CN | 204367538 | U | 6/2015 |
| CN | 109968854 | A | 7/2019 |
| EP | 0 157 546 | A2 | 10/1985 |
| EP | 1113901 | B2 | 8/2008 |
| JP | 2000005887 | A | 1/2000 |
| TW | M328334 | U | 3/2008 |
| WO | 98/51758 | A1 | 11/1998 |
| WO | 99/48963 | A2 | 9/1999 |
| WO | 2018/149778 | A1 | 8/2018 |

OTHER PUBLICATIONS

International Preliminary Report on Patentability of the International Searching Authority, dated Oct. 27, 2022, with respect to International Application No. PCT/EP2021/061404.

English translation of Official Action from Chinese Patent Office dated Mar. 29, 2024, in corresponding parallel Chinese Application No. 202180031753.7—cited only for references disclosed therein. Other non-cited references previously disclosed.

English translation of Official Action from Chinese Patent Office dated Dec. 13, 2024, in corresponding parallel Chinese Application No. 202180031753.7.

* cited by examiner

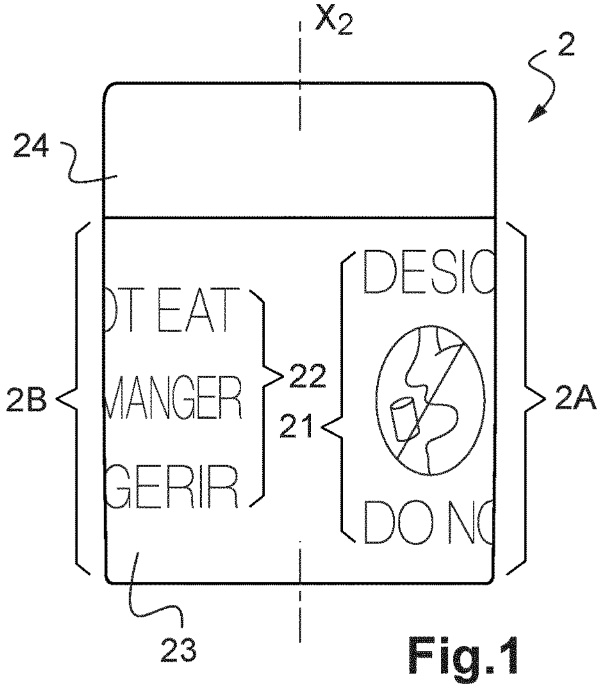
Fig.1
Fig.2
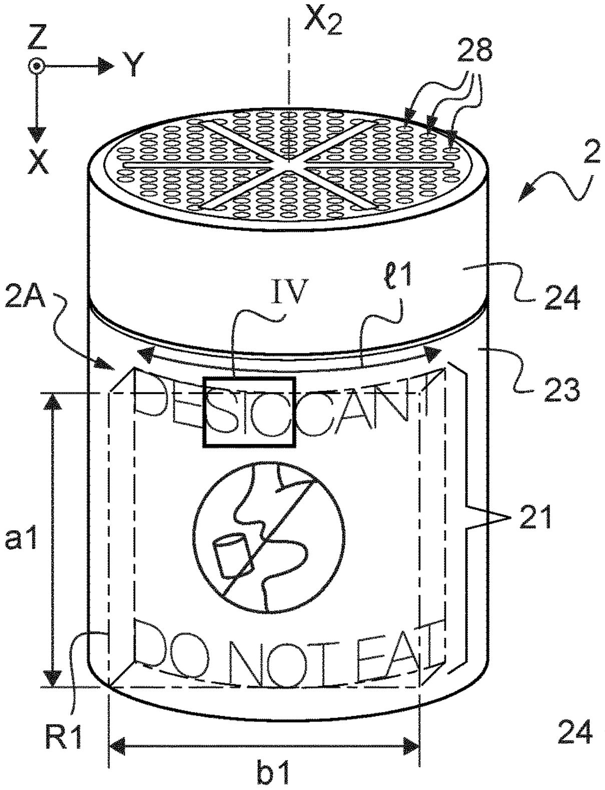
Fig.3
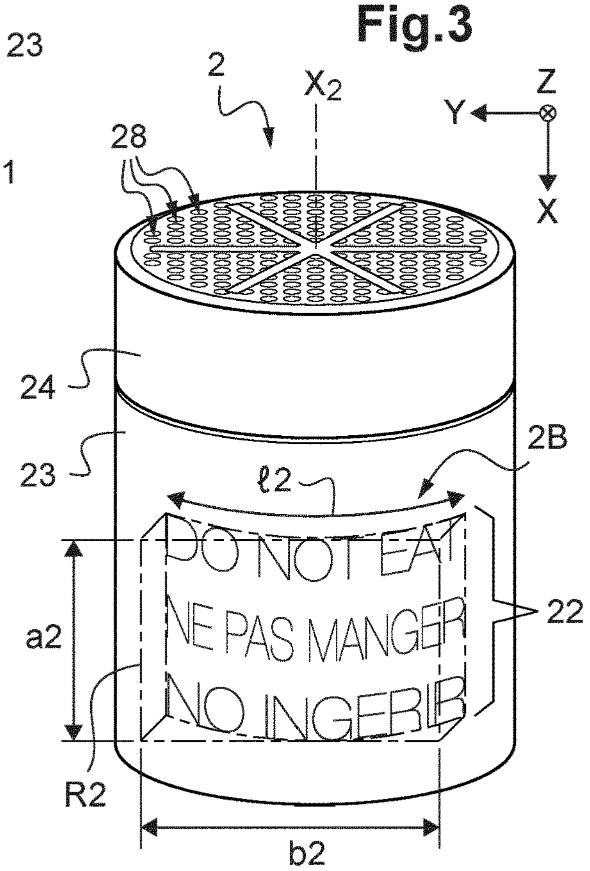

Fig.4
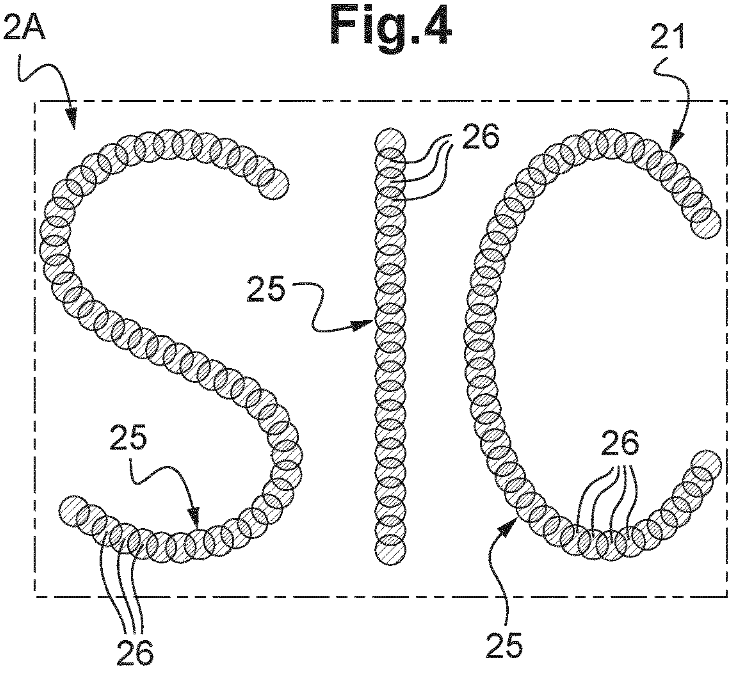
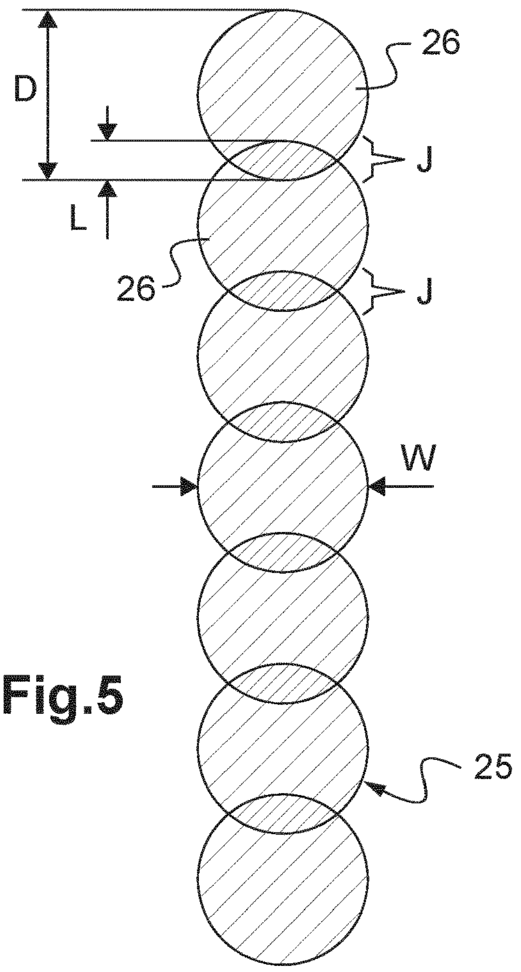
Fig.5

MARKING METHOD AND MARKED RECEPTACLE

FIELD OF THE INVENTION

The present invention relates to a method and an apparatus for the marking of a receptacle moved along a conveying path. In particular, the receptacle may be a canister or a stopper intended to regulate the atmosphere in a packaging containing sensitive products such as food, nutraceutical products, pharmaceutical products or diagnostic products. The invention also relates to a marked receptacle.

BACKGROUND OF THE INVENTION

It is known to use a receptacle filled with an active material to regulate the atmosphere inside a packaging containing sensitive products such as food, nutraceutical products, pharmaceutical products or diagnostic products. The active material may be selected, e.g., in the group of humidity absorbers, oxygen scavengers, odor absorbers, humidity emitters and/or emitters of volatile olfactory organic compounds. In particular, the receptacle may be a canister intended to be dropped in a packaging for sensitive products, or a stopper configured to close a packaging for sensitive products.

Such a receptacle is typically formed from gas permeable elements comprising perforations, the active material received in the inner volume of the receptacle thus being capable of interacting with the gas present in the packaging as it flows through the perforations. The receptacle usually comprises on its external periphery a visual marking, printed with a non-toxic or inert ink delivered, e.g., by a printer, either directly on its peripheral wall or on a label adhered to its peripheral wall. In particular, the visual marking aims to avoid confusion between the receptacle and the consumable sensitive products contained in the packaging.

Incorporating ink printing steps on a line for manufacturing atmosphere control receptables increases the manufacturing time and cost. In particular, the use of printed labels requires additional production steps and materials, while direct ink marking on the receptacle requires precise control of the position of the receptacle relative to an ink depositing instrument in order to accurately deposit the ink, which limits production rates. Production rates may also be undesirably reduced since each freshly marked article must not be disturbed for a particular period of time dictated by the drying requirements of the ink. Poor adherence of the ink to the wall of the receptacle or the label adhered thereto may also compromise marking indelibility and cause a risk of ink migration toward the sensitive products contained in the packaging.

It is these drawbacks that the invention is intended more particularly to remedy by proposing a method and an apparatus for marking a receptacle, and a marked receptacle, ensuring that the marking of the receptacle can be achieved while the receptacle is moved along a conveying path, at even very high rates of production, with high marking resolution and indelibility, the marked pattern being as complete as possible to provide a clear message to a user and avoid any confusion between the receptacle and a consumable product.

DISCLOSURE OF THE INVENTION

For this purpose, a subject of the invention is a method for the marking of a receptacle while it is moved along a conveying path, the method comprising:

moving the receptacle in a marking station along the conveying path;

simultaneously marking a first surface region and a second surface region of the receptacle while it is moved in the marking station along the conveying path, using a first laser beam and a second laser beam emitted in opposite directions on both sides of the receptacle, transversally to the conveying direction, the first and second surface regions being arranged substantially at 180° from each other with respect to a main axis of the receptacle.

The method of the invention is a laser marking method in which the receptacle is marked on the fly, i.e. while it is in continuous motion, involving a simultaneous marking of two opposite surface regions of the receptacle. Such a laser marking method has the advantage of providing high resolution marking in a very efficient manner, compatible with the production rates existing on the manufacturing lines for atmosphere control receptables, which can reach 1000 receptacles per minute. Thanks to the simultaneous marking on two outer surface regions of the receptacle, the marked pattern can be sufficiently complete to meet normative requirements in terms of content and character size, while also respecting the marking time imposed by existing production rates. In this way, the laser marking step according to the invention can be readily incorporated inline, without decreasing the production rate. In addition, the laser marking on each surface region is indelible, which eliminates risks of contamination of sensitive products.

According to one feature, the first laser beam is emitted by a first laser device and the second laser beam is emitted by a second laser device, where the first laser device and the second laser device each comprise a respective laser source. The use of two separate laser sources, to generate respectively the first laser beam and the second laser beam, makes it possible to mark the two surface regions completely independently, and thus mark different patterns on the two surface regions with optimized marking time for each pattern. This is not the case when, e.g., deflecting means are used at the exit of a single laser source to generate two laser beams. In this case, the two laser beams coexist at all times, and it is not possible to turn off one laser beam or to leave one laser beam static, which would result in burning the material at the surface of the receptacle. The control of laser beams obtained from a single laser source, in particular in terms of intensity and optical path length, can be difficult. More generally, the control and efficiency of the marking on each surface region is better when two separate laser sources are used.

Within the meaning of the invention, the expression "simultaneously marking the first surface region and the second surface region" means that the two surface regions are marked during a same marking time period. It is noted that the first and second laser beams may operate synchronously or asynchronously, i.e. the marking of one surface region may be performed synchronously or asynchronously with respect to the marking of the other surface region, provided that the two marking operations take place within the same global marking time period. It is understood that the marking of one surface region may be performed in a shorter time than the marking of the other surface region within said marking time period, both marking times still being lower than or equal to a maximum marking time imposed by the production rate. In particular, when the patterns to be marked on the two surface regions are the same, the operations for marking the two surface regions can be carried out synchronously or asynchronously; when the patterns to be marked on the two surface regions are different from one another, the operations for marking the two surface regions are carried out asynchronously.

For each surface region of the receptacle, the marked pattern includes characters, such as alphanumeric characters or characters from world writing systems, or other symbols, which form, e.g., words, codes, images, logos, etc. For example, normative regulations of the food and drug industry may require the presence of the words “DO NOT EAT” on each receptacle, with a minimum character size, in particular 3 mm according to the Regulation (EC) No. 450/2009 of the European Union. According to one feature of the invention, in order to meet both the normative and production rate constraints, laser beam scanning marking is used, i.e. each laser beam among the first laser beam and the second laser beam writes each character of the marked pattern linearly on the corresponding surface region, in the form of a straight or curved line. The line may be a continuous line, which is obtained when the laser operates in Continuous Wave (CW) or Quasi Continuous Wave (QCW) regime, or the line may be formed by a plurality of successive dots arranged in a row, which is obtained when the laser operates in pulsed regime.

According to one feature, the receptacle to be marked is moved along the conveying path in the marking station in such a way that the first laser beam is focused in a first focal plane corresponding substantially to the first surface region of the receptacle whereas the second laser beam is focused in a second focal plane corresponding substantially to the second surface region of the receptacle.

According to one embodiment, the first surface region and the second surface region of the receptacle are marked while the receptacle is moved in the marking station at a predetermined speed along the conveying path. According to one embodiment, the predetermined speed is a conventional conveying speed used in a manufacturing line for receptables such as atmosphere control receptables, in particular the predetermined speed is higher than or equal to 0.1 m/s, preferably higher than or equal to 0.2 m/s, preferably higher than or equal to 0.5 m/s.

According to one feature of the invention, for at least one of the first and second surface regions of the receptacle, preferably for each of the first and second surface regions of the receptacle, a ratio of the maximum arc length of the pattern marked on said surface region, taken in the circumferential direction of the receptable, to half the circumference of the receptacle is higher than 30%, preferably higher than 40%, more preferably higher than 45%. In one embodiment, the receptacle may have a tubular shape at the level of the marked surface region, so that its circumference is constant at this level. In another embodiment, the receptacle may have a varying cross section at the level of the marked surface region, and in this case the value of the half circumference considered for the ratio defined above is the maximum half circumference of the receptacle at the level of the surface region. More generally, the receptacle has a curved shape so that, when it is moved in the marking station at a conventional conveying speed as mentioned above, the laser marking needs to be made in a very precise time window to be sure that the patterns of the first and second surface regions, which extend over a large portion of the circumference of the receptacle, are properly marked without becoming partial or distorted due to the curvature of the receptacle. In particular, at such high conveying speed and with such high ratio of the maximum arc length of the pattern of at least one surface region, preferably each surface region, to half the circumference of the receptacle, the pattern to be marked may be adapted to avoid stretching of characters due to the conveying speed and/or the curvature of the receptacle.

According to one embodiment, each laser beam among the first laser beam and the second laser beam is produced by a laser device comprising a respective laser source coupled to a beam delivery unit. The beam delivery unit of each laser device is configured to focus the laser beam emitted by the laser source, in the focal plane corresponding to the surface region to be marked, in the form of a spot having a spot diameter in a range of between 50 μm and 150 μm, preferably between 80 μm and 120 μm. Such a laser spot size offers a good compromise for having both precise and legible marking of the corresponding surface region and a high marking speed.

According to one embodiment, each laser spot is displaced, in the focal plane corresponding to the surface region to be marked, according to a scanning trajectory corresponding to a desired pattern to be marked, with an average scanning speed in a range of between 2500 mm/s and 5000 mm/s, preferably between 3000 mm/s and 4500 mm/s. The laser scanning speed is adapted as a function of the predetermined speed at which the receptacle is moved in the marking station. For each surface region, the laser scanning speed may vary during the marking operation. In particular, the laser scanning speed may be higher for the marking of straight lines, compared to the marking of curved lines. Typically, the higher the radius of curvature of a line to be marked, the higher the laser scanning speed.

According to one embodiment, the beam delivery unit of each laser device comprises a X-scanning mirror and a Y-scanning mirror, e.g. driven by galvano-scanners. The laser beam emitted by the laser source is reflected by the X-scanning mirror and the Y-scanning mirror to become a scanning laser beam, which is focused through at least one lens in the focal plane in the form of a laser spot of desired size. For each laser device, the scanning mirrors need time to accelerate from a stationary state to their scanning speed, and then to come back to a stationary state, which defines on- and off-delays for the laser. In one embodiment, for each laser device, each of the on-delay and the off-delay is in a range of between 5 μs and 175 μs, typically between 50 μs and 175 μs.

According to one feature of the invention, each laser beam among the first laser beam and the second laser beam is a pulsed laser beam, the repetition rate and the laser scanning speed being adapted in such a way that the length of an overlap zone between two successive positions of the laser spot to the spot diameter of the laser spot is higher than or equal to 0.15, preferably higher than or equal to 0.3. The overlap length may be higher for curved line segments compared to straight line segments, due to a decrease in the laser scanning speed for the marking of curved line segments. According to one feature, the repetition rate and the laser scanning speed are adapted in such a way that, for the marking of a straight line segment, the ratio of the length of an overlap zone between two successive positions of the laser spot to the spot diameter of the laser spot is in a range of between 0.15 and 0.45, preferably of the order of 0.3. Such an overlap length ensures that each line forming a character of the marked pattern appears to be continuous to the human eye, even if it is formed by a plurality of successive dots arranged in a row.

According to one feature, a marking time of each of the first and second surface regions of the receptacle by the corresponding laser beam is minimized, by determining an optimized scanning trajectory of the laser spot corresponding to an optimized marking order of the characters of the pattern to be marked which minimizes the marking time of the pattern on the surface region.

According to one embodiment, for each of the first surface region and the second surface region of the receptacle, the surface region comprises a polymeric resin and an additive that absorbs radiation in a given wavelength range, and the wavelength of the laser beam marking the surface region is in said given wavelength range.

Examples of suitable polymeric resins for each surface region of the receptacle include, without limitation: polyolefins such as polyethylene, polypropylene, polybutylene, polyisobutylene; copolymers of ethylene such as for example ethylene vinyl acetates, ethylene ethyl acrylates, ethylene butyl acrylates, ethylene maleic anhydrides, ethylene alpha olefins; polystyrene; copolymers of styrene; polyethylene terephthalate (PET); polyvinylchloride (PVC); copolymers of vinyl chloride; polyvinylidene chlorides; derivatives of cellulose; polyamides; polycarbonates; polyoxymethylenes; copolyesters; polyphenylene oxides; polymethyl methacrylates; copolymers of acrylate; fluoride polymers; polyimides; polyurethanes; and any combination thereof. For the marking with a laser beam at a UV wavelength, examples of particularly suitable polymeric resins for each surface region of the receptacle include polyolefins such as polyethylene, e.g. high-density polyethylene (HDPE) or low-density polyethylene (LDPE), or polypropylene; polystyrene; polyethylene terephthalate (PET); polyvinylchloride (PVC).

For each surface region of the receptacle, the additive is preferably a pigment which undergoes a photochemical reaction and changes color under the effect of a laser beam whose wavelength is in the absorption spectrum of the additive. The photochemical reaction minimizes thermal effects on the surface region to be marked. Advantageously, the color change of the additive takes place with limited heat transfer to the surrounding material so that material burning or material ablation are avoided. In one embodiment, the additive is titanium dioxide ($TiO_2$), which absorbs radiation in the ultraviolet (UV) wavelength range below 400 nm. The photochemical reaction induces a color change of the additive so that the color of the surface region of the receptacle becomes darker where it has been irradiated by the laser beam, thereby forming a darker marked pattern on the surface region. In particular, when the additive is $TiO_2$, the color of the surface region is changed from white to grey where it has been irradiated by a laser beam at a UV wavelength.

According to one embodiment, the wavelength of the laser beam, which is used to produce the photochemical reaction on the surface region of the receptacle, is in the UV wavelength range between 100 nm and 400 nm. To obtain a UV wavelength, the laser source may be an infrared laser in which a harmonic in the UV wavelength range is used, or a laser the output of which is in the UV wavelength range. Examples of suitable lasers include, e.g.: a frequency-tripled Nd:YVO4 emitting at a wavelength of 355 nm; a frequency-tripled Nd:YAG laser emitting at a wavelength of 355 nm; an excimer laser emitting in the deep UV range, e.g. a KrF excimer laser emitting at a wavelength of 248 nm.

According to one feature, for each laser beam among the first laser beam and the second laser beam, the laser source is a pulsed source with a pulse width of less than 25 ns. A short pulse duration leads to a high peak power to induce the photochemical reaction, while reducing the thermal transfer to the surrounding material, which is advantageous for obtaining a marked pattern without material ablation.

According to one embodiment, for each laser beam among the first laser beam and the second laser beam, the energy density, in the focal plane corresponding to the surface region to be marked, is adapted to avoid material ablation. In particular, the energy density in the focal plane is less than 2 J/cm$^2$ when the surface region comprises a polymeric resin.

By way of example, in a nonlimiting and purely illustrative embodiment, for each surface region of the receptacle, the polymeric resin is a polyolefin, e.g. polyethylene; the additive is titanium dioxide ($TiO_2$), e.g. in an amount of between 0.5 and 5 wt %; each laser source is a diode-pumped frequency-tripled Nd:YVO4 laser emitting pulses at 355 nm, e.g. with a repetition rate of 50 kHz, a pulse width of less than 25 ns and a pulse energy of 160 μJ. Throughout this text, the wt %-number provides the % of weight of the additive over the total weight of the composition. By way of example, when the polymeric resin is polyethylene and the additive is $TiO_2$ in an amount of between 1 and 3 wt %, the energy density in the focal plane is preferably higher than or equal to 1 J/cm$^2$ in order to have sufficient contrast and less than or equal to 2 J/cm$^2$ in order to avoid ablating the material.

According to one feature of the invention, the step of laser marking the receptacle according to the method of the invention is performed after a step of filling the receptacle with an active material. In this case, the receptacle which is marked in the marking station by the first and second laser beams, while being moved along the conveying path, is a filled receptacle containing active material in its inner volume. The active material received in the inner volume of the receptacle may be any type of active material. Within the meaning of the invention, an active material is a material capable of regulating the atmosphere in a packaging or a container, especially intended to receive sensitive products. In particular, the active material may be selected in the group of: humidity absorbers; oxygen scavengers; odor absorbers; emitters of humidity or volatile olfactory organic compounds; and any combination thereof. The active material may be capable of releasing gaseous substances such as moisture or perfume. Such properties can for example be useful for applications where sensitive products require a certain humidity level. Such products are, for example, powders, especially for generating aerosols, gelatin capsules, herbal medicine, gels and creams including cosmetics, and food products.

Examples of suitable dehydrating agents include, without limitation, silica gels, dehydrating clays, activated alumina, calcium oxide, barium oxide, natural or synthetic zeolites, molecular or similar sieves, or deliquescent salts such as magnesium sulfide, calcium chloride, aluminum chloride, lithium chloride, calcium bromide, zinc chloride or the like. Preferably, the dehydrating agent is a molecular sieve and/or a silica gel.

Examples of suitable oxygen collecting agents include, without limitation, metal powders having a reducing capacity, in particular iron, zinc, tin powders, metal oxides still having the ability to oxidize, in particular ferrous oxide, as well as compounds of iron such as carbides, carbonyls, hydroxides, used alone or in the presence of an activator such as hydroxides, carbonates, sulfites, thiosulfates, phosphates, organic acid salts, or hydrogen salts of alkaline metals or alkaline earth metals, activated carbon, activated alumina or activated clays. Other agents for collecting oxygen can also be chosen from specific reactive polymers such as those described for example in the patent documents U.S. Pat. No. 5,736,616 A, WO 99/48963 A2, WO 98/51758 A1 and WO 2018/149778 A1.

According to one embodiment, both steps of filling the receptacle and marking the filled receptacle are performed inline. In particular, the receptacle may be filled in a filling station located upstream of the marking station with respect to the conveying direction, in which the active material is introduced in the inner volume of the receptacle and the receptacle is closed to avoid escape of the active material. In an advantageous embodiment, the filled receptacle can be moved continuously along the conveying path, e.g. at the predetermined speed, from the filling station to the marking station and then within the marking station.

According to one feature of the invention, the step of laser marking the receptacle according to the method of the invention is followed by a step of controlling the quality of the marking on each of the first and the second surface regions of the receptacle. According to one embodiment, the control of the marking on each surface region is performed using a first camera and a second camera positioned on both sides of the receptacle, in such a way that the first camera faces the first surface region of the receptacle and the second camera faces the second surface region of the receptacle. The first and second cameras ensure independently that each surface region of the receptacle is indeed marked with its respective pattern by the first and second laser beams. In one embodiment, not only does each camera ensure that a marking is present on the corresponding surface region of the receptacle, but each camera also ensures within a certain tolerance that the marked pattern on the corresponding surface region is complete. Such a control by two independent cameras is key for the two-laser automation system at high production rates.

According to one embodiment, both steps of marking the receptacle and controlling the marking on each surface region of the receptacle are performed inline. In particular, the marking on each surface region of the receptacle may be controlled in a control station located downstream of the marking station with respect to the conveying direction. In an advantageous embodiment, the receptacle can be moved continuously along the conveying path, e.g. at a predetermined speed, within the marking station, then from the marking station to the control station, and then within the control station.

According to one feature of the invention, the step of laser marking the receptacle according to the method of the invention is performed after a step of separating successive receptacles by a spacing, in such a way that the receptacles pass individually in the marking station, in a time-discrete manner. Advantageously, the spacing between two successive receptacles to be marked in the marking station is adjusted according to a speed of the receptacles along the conveying path in the marking station and the on- and off-delays of the laser devices, so that each laser device can switch back to a ground state between two successive receptacles.

According to one embodiment, the separation of the successive receptacles by a spacing is performed, in a separation station located upstream of the marking station with respect to the conveying direction, using a separation device which applies a given distance between successive receptacles, e.g. initially grouped in a random way at the entrance of the separation device. In an advantageous embodiment, the successive receptacles are moved continuously along the conveying path, at a given speed and with the given spacing between them, from the separation station to the marking station, and then within the marking station.

In one embodiment, the spacing between the successive receptacles is a constant spacing, so that the receptacles pass in the marking station with a constant frequency, i.e. at regular time intervals.

According to one feature, for each receptacle to be marked, the simultaneous marking of the first surface region and the second surface region of the receptacle in the marking station is controlled as a function of the speed at which the receptacle is moved in the marking station and a triggering time.

According to one feature, the first and second laser beams are emitted by first and second laser devices each comprising a respective laser source, the first and second laser devices being controlled as a function of the speed at which the receptacle is moved in the marking station and a triggering time. According to one feature, each laser device is triggered from a ground state and the triggering time is adjusted to take into account the on- and off-delays of each laser device.

According to one feature, the triggering time is the same for the first and second laser devices. Such a common triggering time for the two laser devices ensures that the two marking operations start substantially at the same time so that, even if the marking of one surface region is performed in a longer time than the marking of the other surface region, both marking take place within a global marking time period lower than or equal to a maximum marking time imposed by the production rate.

In one embodiment, the triggering time for both the first laser device and the second laser device is determined using a single sensor configured to detect a position of the receptacle to be marked along the conveying path. The marking triggering sensor can be located upstream of the first and second laser devices with respect to the conveying direction.

In another embodiment, the triggering time for the first laser device is determined using a first sensor, whereas the triggering time for the second laser device is determined using a second sensor, each of the first and second sensors being configured to detect a position of the receptacle to be marked along the conveying path, which position may be the same or may be different for the two sensors. Each marking triggering sensor can be located upstream of the corresponding laser device with respect to the conveying direction.

In another embodiment, the triggering time for the first laser device and the second laser device is computed from the speed at which the receptacle is moved along the conveying path in the marking station and a spacing between successive receptacles to be marked in the marking station.

The invention also relates to a computer program comprising instructions for the implementation of steps of a marking method as described above when the program is executed by a computer. In one embodiment, said steps comprise:

- receiving a value of the speed at which the receptacle is moved in the marking station along the conveying path;
- obtaining a triggering time for the first laser device and the second laser device, either by receiving a signal from at least one marking triggering sensor configured to detect a position of a receptacle to be marked along the conveying path or by computing the triggering time from the speed at which the receptacle is moved in the marking station along the conveying path and a spacing between successive receptacles to be marked;
- triggering the first laser device and the second laser device to operate a simultaneous marking of the first surface region and the second surface region of a receptacle when it passes in the marking station, using the first laser beam and the second laser beam emitted in opposite directions on both sides of the receptacle, transversally to the conveying direction.

Another subject of the invention is a non-transitory computer readable medium comprising instructions for the implementation of steps of a marking method as described above when the instructions are executed by a computer.

According to one embodiment, the instructions of the computer program or the computer readable medium further comprise at least one instruction for minimizing a marking time of each of the first and second surface regions of the receptacle by the corresponding laser beam, by determining, e.g. computing, an optimized scanning trajectory of the laser spot of the laser device corresponding to an optimized marking order of the characters of the pattern to be marked, which minimizes the marking time of the pattern on the surface region.

Another subject of the invention is a laser-marked receptacle obtained by the method as described above. According to one embodiment, in each laser-marked surface region of the laser-marked receptacle, the laser-marked dots are arranged in lines such that a width of each line corresponds to the diameter of one laser-marked dot.

Another subject of the invention is a laser-marked receptacle, notably a canister or a stopper intended to be used in a packaging filled with sensitive products such as food, nutraceutical products, pharmaceutical products or diagnostic products, wherein said marked receptacle comprises on its outer surface two laser-marked surface regions arranged substantially at 180° from each other with respect to a main axis of the receptacle, wherein each laser-marked surface region comprises a respective marked pattern formed of a plurality of laser-marked dots resulting from a color change of the material of the outer surface under the effect of a photochemical reaction induced by a laser beam, in particular with limited heat transfer to the surrounding material so that material annealing or material ablation are avoided, wherein, in each laser-marked surface region, the laser-marked dots are arranged in straight or curved lines such that a width of each line corresponds to the diameter of one laser-marked dot. Advantageously, in each laser-marked surface region, each character of the marked pattern is formed linearly by straight or curved line segments each comprising a single row of laser-marked dots. In particular, the single row of laser-marked dots is not juxtaposed to another row of laser-marked dots. Such an arrangement of the characters of each marked pattern of the laser-marked receptacle is different from, e.g., a marked pattern where the characters are defined by a matrix having a predetermined number of rows and columns, which is much longer to produce compared to a pattern obtained by linear scanning marking. Preferably, the successive laser-marked dots in each line are connected to each other in an overlap zone.

The arrangement of the laser-marked dots in lines, where the width of each line corresponds to the diameter of a single laser-marked dot, corresponds to an optimized marking speed of the laser-marked pattern on each surface region of the receptacle. In particular, the marking speed achieved with such a linear arrangement of the laser-marked dots is higher than that achieved with a scattered arrangement of the laser-marked dots. In this way, the marked receptacle according to the invention can be obtained while respecting marking times imposed by the production rates existing on the manufacturing lines for atmosphere control receptables, where the imposed marking time may be, e.g., less than 120 ms for a production rate of 500 receptacles per minute, or even less than 60 ms for a production rate of 1000 receptacles per minute.

For each surface region of the receptacle, the marked pattern is indelible and includes characters, such as alphanumeric characters or characters from world writing systems, or other symbols, which form, for example, words, codes, images, logos, etc. Thanks to the presence of a laser-marked pattern on two outer surface regions of the receptacle and the linear arrangement of the laser-marked dots in each marked pattern, the marking on the marked receptacle according to the invention can be sufficiently complete to meet normative requirements in terms of content and font size, such as the requirements of EU labeling Regulation (EC) No. 450/2009 requiring the inscription "DO NOT EAT" on each receptacle, with a minimum font size of 3 mm. According to one feature, the patterns marked on the two surface regions of the receptacle result from a color change of the material of the receptacle without material burning or material ablation, which is important especially in nutraceutical or pharmaceutical sectors where dust or surface defects should be avoided.

According to one feature of the invention, for each laser-marked surface region of the marked receptacle, the total linear length of the marked pattern is less than 700 mm, preferably less than 350 mm, preferably less than 175 mm. Within the frame of the invention, the total linear length of the marked pattern is the sum of the lengths of all the line segments forming the characters of the marked pattern, where the length of each line segment is taken in the longitudinal direction of the line segment. In other words, the length of each line segment corresponds to the sum of the diameters of the laser-marked dots composing the line segment from which is subtracted the length of the overlap zones between the successive laser-marked dots.

According to another feature of the invention, for each laser-marked surface region of the marked receptacle, the number of laser-marked dots forming the marked pattern is less than 10000, preferably less than 6000, preferably less than 3000. According to another feature of the invention, a surface density of the laser-marked dots for the marked pattern on each surface region, defined as the ratio of the number of laser-marked dots forming the marked pattern to the surface area of the smallest rectangle within which the marked pattern is inscribed, is less than 300 dots/$mm^2$, preferably less than 150 dots/$mm^2$, preferably less than 70 dots/$mm^2$, preferably less than 35 dots/$mm^2$. It is noted that, when the surface region comprising the marked pattern is a non-planar surface region, the considered circumscribing rectangle is the smallest rectangle, tangent to the non-planar surface region and orthogonal to a laser-marking direction, within which the projection of the marked pattern is inscribed. Such limited number of laser-marked dots, or limited laser-marked dot density, on each laser-marked surface region of the receptacle, make it possible to reach a marking speed of each receptacle compatible with existing inline production rates. For a marked receptacle according to the invention, each marked pattern can typically be inscribed in a smallest circumscribing rectangle with a length of each side of the rectangle in a range of between 5 mm and 50 mm.

According to one embodiment, for each line of each laser-marked surface region, the ratio of the length of the overlap zone between two successive laser-marked dots in the longitudinal direction of the line to the diameter of each laser-marked dot is higher than or equal to 0.15, preferably higher than or equal to 0.3. The overlap length may be higher for curved line segments compared to straight line segments, due to a decrease in the laser scanning speed for the marking of curved line segments. According to one feature, for each straight line segment of each laser-marked surface region, the ratio of the length of the overlap zone between two successive laser-marked dots in the longitudinal direction of the straight line to the diameter of each laser-marked dot is in a range of between 0.15 and 0.45, preferably of the order of 0.3. Such an overlap length between the successive laser-marked dots ensures that each line forming a character of the marked pattern appears to be continuous to the human eye, even if it is formed by a plurality of successive dots.

According to one embodiment, in each laser-marked surface region of the marked receptacle, the diameter of each laser-marked dot is in a range of between 50 μm and 150 μm, preferably between 80 μm and 120 μm. Advantageously, the diameter of each laser-marked dot is selected so as to allow high speed laser marking, while also ensuring a good marking resolution and an energy density in the surface region which maintains the integrity of the material.

According to one embodiment, for at least one pattern marked on a surface region of the receptacle, a ratio of the maximum arc length of the pattern in the circumferential direction of the receptable to half the circumference of the receptacle is higher than 30%, preferably higher than 40%, more preferably higher than 45%. With such a ratio for at least one of the first and second marked surface regions, the marked patterns extend over a large portion of the circumference of the receptacle, thus making it possible to provide a clear message to a user. In one embodiment, the receptacle may have a tubular shape at the level of the marked surface region, so that its circumference is constant at this level. In another embodiment, the receptacle may have a varying cross section at the level of the marked surface region, and in this case the value of the half circumference considered for the ratio defined above is the maximum half circumference of the receptacle at the level of the surface region.

According to one embodiment, the patterns marked on the two surface regions of the receptacle are different from one another, which also helps to deliver a clear message to a user, e.g. by providing an inscription in English on a first surface region and its translation in another language or a corresponding symbol on the second surface region.

According to one embodiment, the marked receptacle is filled with an active material. The active material received in the inner volume of the receptacle may be any type of active material capable of regulating the atmosphere in a packaging or a container, e.g. selected in the group of: humidity absorbers; oxygen scavengers; odor absorbers; emitters of humidity or volatile olfactory organic compounds; and any combination thereof.

According to one embodiment, the outer surface of the marked receptacle is a polymeric surface comprising a polymeric resin and an additive that absorbs radiation in a given wavelength range, in particular with an amount of the additive of between 0.5 and 5 wt %. In one embodiment, the additive is titanium dioxide ($TiO_2$), preferably in an amount equal to or higher than 1 wt %, more preferably in an amount equal to or higher than 2 wt %, and the color of the laser-marked dots in each laser-marked surface region is darker than the color of the rest of the outer surface of the marked receptacle. In particular, when the additive is $TiO_2$, a typical color of each laser-marked dot is grey, whereas a typical color of the rest of the outer surface of the marked receptacle is white.

The invention also relates to an apparatus for the marking of successive receptacles in a marking station, the apparatus comprising:

a conveyor for moving successive receptacles in the marking station along a conveying path;

a first laser device and a second laser device each comprising a respective laser source, which are located on both sides of the conveying path and configured to emit two laser beams in opposite directions, transversally to the running direction of the conveyor, in such a way that:

the laser beam of the first laser device is focused in a first focal plane corresponding substantially to a first surface region of a receptacle passing in the marking station, and the laser beam of the second laser device is focused in a second focal plane corresponding substantially to a second surface region of a receptacle passing in the marking station, wherein, for each receptacle, the first and second surface regions are arranged substantially at 180° from each other with respect to a main axis of the receptacle;

a controller configured to control the first and second laser devices as a function of the speed of the conveyor and a triggering time, which is preferably the same for both laser devices.

According to one embodiment, each laser device comprises a laser source for emitting a laser beam, which is coupled to a beam delivery unit, wherein the beam delivery unit is configured to focus the laser beam in the focal plane in the form of a laser spot having a spot diameter in a range of between 50 μm and 150 μm, preferably between 80 μm and 120 μm.

According to one feature, the beam delivery unit is configured to move the laser spot in the focal plane, according to a scanning trajectory corresponding to a desired pattern to be marked, with an average scanning speed in a range of between 2500 mm/s and 5000 mm/s, preferably between 3000 mm/s and 4500 mm/s.

In one embodiment, the scanning trajectory for the beam delivery unit of the first laser device is different from the scanning trajectory for the beam delivery unit of the second laser device. In this case, the marked pattern on the first surface region of the receptacle is different from the marked pattern on the second surface region of the receptacle.

According to one embodiment, each laser source is a pulsed laser source, the repetition rate and the laser scanning speed being adapted in such a way that the ratio of the length of an overlap zone between two successive positions of the laser spot to the spot diameter of the laser spot is higher than or equal to 0.15, preferably higher than or equal to 0.3. The overlap length may be higher for curved line segments compared to straight line segments, due to a decrease in the laser scanning speed for the marking of curved line segments. According to one feature, the repetition rate and the laser scanning speed are adapted in such a way that, for the marking of a straight line segment, the ratio of the length of an overlap zone between two successive positions of the laser spot to the spot diameter of the laser spot is in a range of between 0.15 and 0.45, preferably of the order of 0.3.

According to one feature, each laser device is triggered from a ground state and the triggering time is adjusted to take into account the on- and off-delays of each laser device.

In one embodiment, the triggering time for both the first laser device and the second laser device is determined by a single sensor configured to detect a position of the receptacle transported by the conveyor.

In another embodiment, the triggering time for the first laser device is determined by a first sensor, whereas the triggering time for the second laser device is determined by a second sensor, each of the first and second sensors being configured to detect a position of the receptacle to be marked along the conveying path, which position may be the same or may be different for the two sensors.

In another embodiment, the triggering time for the first laser device and the second laser device is computed from the speed at which the receptacle is moved along the conveying path in the marking station and a spacing between successive receptacles to be marked in the marking station.

In another embodiment, the triggering time for the first laser device and the second laser device is computed from the speed of the conveyor in the marking station and a spacing between successive receptacles transported by the conveyor.

According to one embodiment, the controller is configured to monitor the laser marking by controlling at least one laser parameter of each of the first and second laser devices selected from the group of: the focal laser spot diameter, the laser average power, the laser scanning speed, the repetition rate, the pulse width, the marking direction, and a combination thereof.

BRIEF DESCRIPTION OF THE DRAWINGS

Features and advantages of the invention will become apparent from the following description of embodiments of a marked canister and a marking method and apparatus according to the invention, this description being given merely by way of example and with reference to the appended drawings in which:

FIG. 1 is a side view of a marked canister according to one embodiment the invention, comprising on its outer surface two laser-marked surface regions arranged substantially at 180° from each other with respect to a central axis of the canister;

FIG. 2 is a perspective view of the marked canister of FIG. 1 on the side of a first laser-marked surface region;

FIG. 3 is a perspective view of the marked canister of FIG. 1 on the side of a second laser-marked surface region;

FIG. 4 is a view at larger scale of the detail IV of FIG. 2;

FIG. 5 is a magnified view of the constitutive lase-marked dots of a marked character of FIG. 4, illustrating appropriate dot diameter and overlap length produced with the marking method according to the invention;

ILLUSTRATIVE EMBODIMENTS OF THE INVENTION

Figure 6:
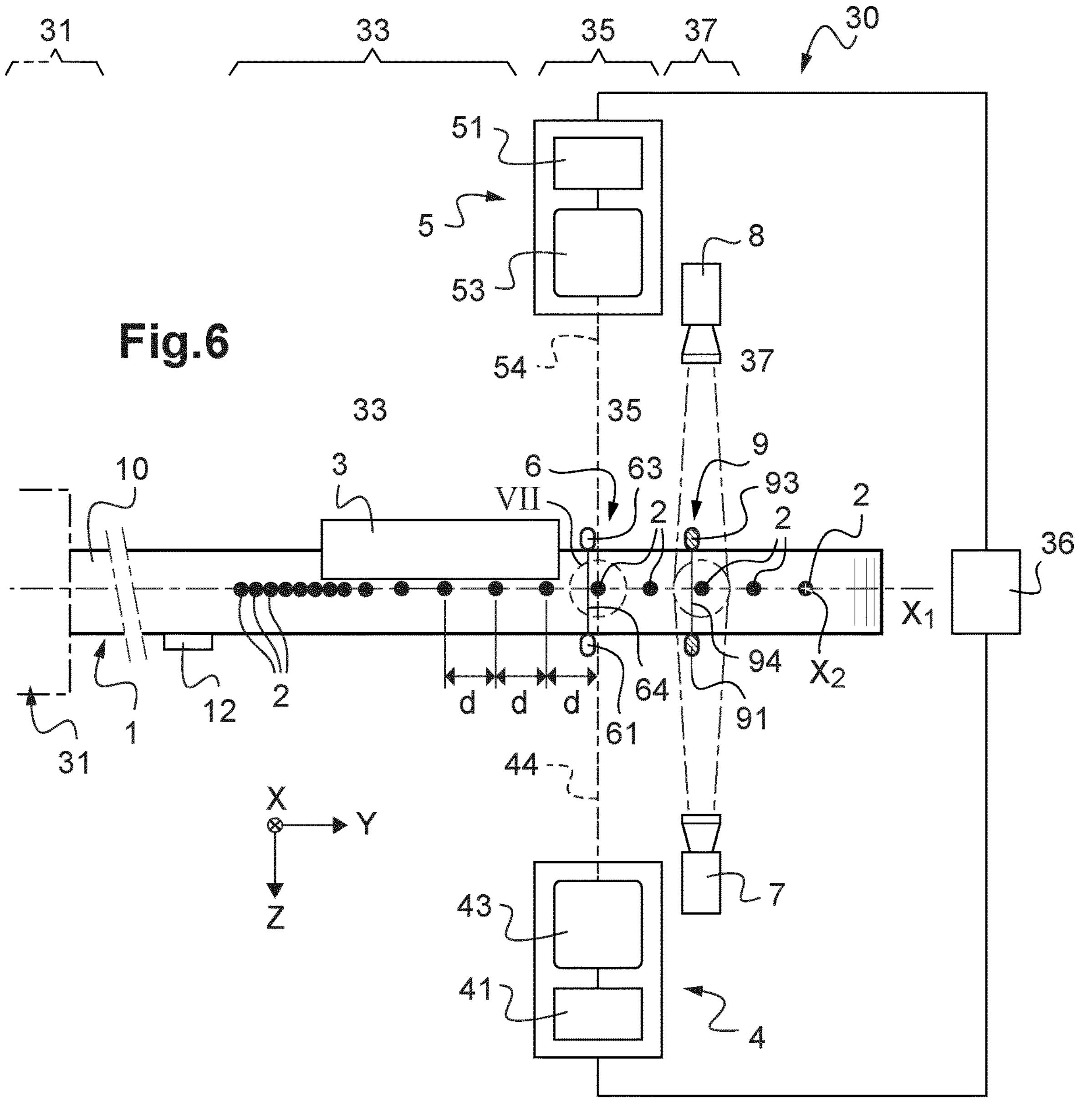
FIG. 6 is a schematic top view of part of a manufacturing line 30 for producing marked canisters similar to that of FIG. 1, comprising a marking apparatus according to one embodiment the invention.
Figure 7:
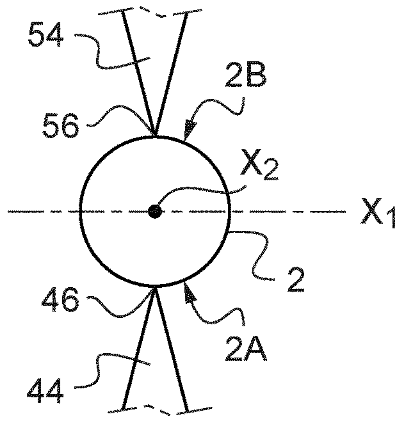
FIG. 7 is a view at larger scale of the detail VII of FIG. 6.

The figures illustrate a marked canister 2 according to one embodiment of the invention, and a portion of a manufacturing line 30 for producing such marked canisters 2. As shown in FIG. 6, successive operations are performed on the canisters 2 in the manufacturing line 30, i.e. successively: each canister 2 is filled, assembled and closed in a filling station 31; the canisters 2 are separated from one another in a separation station 33; each canister 2 is laser marked in a marking station 35; each canister 2 is controlled with regard to the quality of its laser marking in a control station 37.

In the example of FIGS. 1 to 3, the marked canister 2 comprises a tubular body 23 and a gas-permeable cap 24. The gas-permeable cap 24 is provided with a plurality of perforations 28 and configured to be fastened on the tubular body 23, e.g. by clipping. The tubular body 23 has a circular cross section and comprises a bottom wall and a peripheral wall delimiting a volume for receiving an active material, which is closed by the gas-permeable cap 24. By way of a non-limiting example, the active material received in the inner volume of the canister 2 may be a dehydrating agent (or desiccant) in a powder or granular form, e.g. selected from molecular sieves, silica gels and/or dehydrating clays. The canister 2 is intended to be dropped in a packaging (not represented) in which sensitive products are stored, so as to regulate the atmosphere inside the packaging.

As clearly visible in FIG. 1, the tubular body 23 of the canister comprises on its outer surface two laser-marked surface regions 2A and 2B, arranged substantially at 180° from each other with respect to a central axis $X_2$ of the canister 2. Each laser-marked surface region 2A, 2B comprises a respective marked pattern 21, 22. In this illustrative embodiment, the marked pattern 21 on the surface region 2A is different from the marked pattern 22 on the surface region 2B.

The combination of the two marked patterns 21 and 22 is configured to satisfy normative requirements, e.g. in terms of content and font size. In particular, the marked pattern 21 on the surface region 2A comprises the inscriptions "DESICCANT" and "DO NOT EAT", as well as a symbol showing that the canister should not be ingested, whereas the marked pattern 22 on the surface region 2B comprises the inscription "DO NOT EAT" and its translations in French and Spanish languages.

As visible in the view at larger scale of FIG. 4, each character of the marked patterns 21 and 22 is formed by a plurality of laser-marked dots 26, which are arranged in straight or curved lines 25. In an illustrative embodiment, which is given only by way of example and is not limitative, the tubular body 23 and the cap 24 of the canister are both made of a polymeric material comprising a polyethylene matrix and titanium dioxide ($TiO_2$) as an additive in an amount of 1 to 3 wt %, which gives a white color to the canister 2. The laser-marked dots 26 of each marked pattern 21, 22 have a grey color which makes them visually distinct from the white background.

The grey colored laser-marked dots 26 result from $TiO_2$ reduction in zones where the surface regions 2A and 2B have been irradiated with a pulsed UV laser radiation. The duration and intensity of each dot-producing pulse and the pulse repetition rate are determined according to the surface material to be marked. Advantageously, $TiO_2$ reduction is a photochemical reaction which absorbs a great quantity of photon energy, so that thermal effects are minimized on the surface regions 2A and 2B and the color change of the laser-marked dots 26 takes place without burning or ablating the surrounding polymer material. Good resolution and good contrast of the laser-marked dots 26 are thus obtained.

It can be seen in the figures that, for each marked pattern 21 or 22, each segment of line 25 of each character of the marked pattern is formed by a single row of laser-marked dots 26. Then, for each marked pattern 21 or 22, a width W of each line or segment of line 25 corresponds to the diameter D of one laser-marked dot 26. This is due to the specific process used to mark the two surface regions 2A and 2B of the canister, in which a laser beam writes each character of the marked pattern linearly on the corresponding surface region, in the form of a straight or curved line. Such a linear scanning marking is the most efficient method to mark the canister 2 while respecting the marking times imposed by existing production rates for canisters. Advantageously, in this embodiment, the marked patterns 21 and 22 do not contain any segment of line which comprises a matrix of juxtaposed dots in a direction transverse to the longitudinal direction of the segment of line.

As shown in FIG. 5, for each marked pattern 21 or 22, the successive laser-marked dots 26 in each line 25 are connected to each other in an overlap zone J. By way of example, in this illustrative embodiment, the diameter D of each laser-marked dot 26 is 100 μm and the length L of the overlap zone J in each straight line segment is 30 μm, i.e. there is a 30% overlap. The overlap length L may be higher than 30 μm for curved line segments compared to straight line segments, due to a decrease in the laser scanning speed for the marking of curved line segments. Such a value of the ratio of the overlap length L to the dot diameter D ensures that each line 25 forming a character in the marked patterns 21, 22 appears to be continuous to the human eye.

In order to reach high marking speed, when the marking method of the invention is used, in which the two surface regions 2A and 2B of the canister 2 are marked simultaneously by two laser beams emitted in opposite directions on both sides of the canister 2, it is possible to calculate a maximum number of laser-marked dots 26 in each of the surface regions 2A and 2B, based on a maximum marking time imposed for the canister 2 and a repetition rate of each laser used to create the laser-marked dots 26. For example, if the canister 2 is to be marked in less than 60 ms, and the lasers used to mark simultaneously the two surface regions 2A and 2B have a repetition rate of 50 kHz, then the number of laser-marked dots 26 constituting each marked pattern 21 or 22 will have to be less than 3000. Knowing a desired length of the pattern to be marked, it is then possible to dimension the values of the dot diameter D and the overlap length L.

Conversely, if the values of the dot diameter D and the overlap length L are fixed, another parameter that can be calculated, based on a maximum marking time for the canister 2 and a repetition rate of each laser used to create the laser-marked dots 26, is the total linear length of each marked pattern 21 or 22, i.e. the sum of the lengths of all the line segments forming the characters of the marked pattern, where the length of each line segment is taken in the longitudinal direction of the line segment. For example, if the canister is to be marked in less than 60 ms, the lasers used to mark simultaneously the two surface regions 2A and 2B have a repetition rate of 50 kHz, the dot diameter D is 100 μm, then the total linear length of each marked pattern 21 or 22 will have to be less than 300 mm, and even less if an overlap length between successive dots is considered.

Advantageously, in this embodiment, the surface density of the laser-marked dots 26 for each of the marked patterns 21 and 22 is less than 35 dots/mm$^2$. The surface density of the laser-marked dots 26 of a marked pattern is defined as the ratio of the number of laser-marked dots 26 forming the marked pattern to the surface area of the smallest circumscribing rectangle tangent to the surface region within which the projection of the marked pattern is inscribed. By way of example, with reference to FIGS. 2 and 3, where the X-direction is parallel to the central axis $X_2$ and the X- and Y-directions define a plane tangent to each surface region 2A, 2B of the canister 2, the orthogonal projection of the marked pattern 21 on the X-Y plane tangent to the surface region 2A is inscribed within a circumscribing rectangle R1 having a side length a1 of 10 mm along the X-axis and a side length b1 of 9 mm along the Y-axis, while the orthogonal projection of the marked pattern 22 on the X-Y plane tangent to the surface region 2B is inscribed within a circumscribing rectangle R2 having a side length a2 of 8 mm along the X-axis and a side length b2 of 10.5 mm along the Y-axis.

In this embodiment, for each of the surface region 2A, 2B of the canister 2, a ratio of the maximum arc length of the pattern 21, 22, taken in the circumferential direction of the canister, to half the circumference of the canister is higher than 45%. With such a ratio, the patterns 21, 22 extend over a large portion of the circumference of the canister 2, so that they can be sufficiently complete and legible to provide a clear message to a user. By way of example and without limitation, with reference to FIGS. 2 and 3: the diameter of the canister 2 is 19.35 mm, which corresponds to a half circumference of the canister of 30.40 mm; for the surface region 2A, the maximum arc length ℓ1 of the marked pattern 21 is 14.08 mm, which corresponds to a ratio of the maximum arc length ℓ1 to half the circumference of the canister of the order of 46.3%; for the surface region 2B, the maximum arc length ℓ2 of the marked pattern 22 is 14.84 mm, which corresponds to a ratio of the maximum arc length ℓ2 to half the circumference of the canister of the order of 48.8%.

As shown schematically in FIG. 6, the manufacturing line 30 for manufacturing filled and marked canisters 2 comprises a conveyor 1 for moving the canisters 2 at a predetermined speed along a conveying path 10. The stations are arranged successively along the conveying path 10, including in the running direction $X_1$ of the conveyor 1:

- the filling station 31, in which the active material is introduced in the inner volume of the tubular body 23 of each canister 2 and the canister 2 is assembled and closed by clipping the cap 24 on the tubular body 23 to avoid escape of the active material;
- the separation station 33, in which successive canisters 2, initially grouped in a random way, are separated by a constant spacing d by a separation device 3;
- the marking station 35, in which the two surface regions 2A and 2B of each canister 2 are marked simultaneously by two laser devices 4, 5; as shown in FIG. 6, the X-scanning direction of the laser devices 4, 5 is parallel to the central axis $X_2$ of each canister 2, whereas the Y-scanning direction of the laser devices 4, 5 is parallel to the running direction $X_1$ of the conveyor 1;
- the control station 37, in which the marked patterns on the two surface regions 2A, 2B of each canister 2 are controlled by two cameras 7, 8 positioned on both sides of the conveyor 1, in such a way that the camera 7 faces the surface region 2A of the canister and the camera 8 faces the surface region 2B of the canister. The cameras 7 and 8 ensure independently that each surface region 2A, 2B of the canister 2 is indeed marked with its respective pattern 21, 22 by the laser devices 4, 5. In this embodiment, not only does each camera 7, 8 ensure that the pattern 21, 22 is present on the corresponding surface region 2A, 2B of each canister 2, but each camera 7, 8 also ensures within a certain tolerance that the marked pattern 21, 22 is complete in terms of characters (letters and symbols in the represented example).

The canisters 2 are moved continuously by the conveyor 1 along the conveying path 10, successively from one station to the following one and within each of the separation station 33, the marking station 35, the control station 37. The speed of the conveyor 1 is advantageously measured by a speed sensor 12, such as an encoder wheel. The spacing d imposed between the successive canisters 2 by the separation device 3 is adjusted according to the speed of the conveyor 1, as measured by the speed sensor 12, and according to the on- and off-delays of the laser devices 4, 5, in such a way that each of the two laser devices 4, 5 can switch back to a ground state between the marking of two successive canisters 2.

The manufacturing line 30 also comprises two triggering sensors 6 and 9, which are located respectively upstream of the marking station 35 and upstream of the control station 37. Each triggering sensor 6, 9 comprises an emitter 61, 91 and a detector 63, 93 arranged on both sides of the conveying path 10, such that a radiation beam 64, 94 emitted by the emitter 61, 91 is detected by the corresponding detector 63, 93, while crossing the conveying path 10. In this way, each triggering sensor 6, 9 can detect the presence of a canister 2 just upstream of the station 35 or 37, when the canister 2 passes between the emitter 61, 91 and the detector 63, 93, which interrupts the beam 64, 94. The detection of a canister 2 by the marking triggering sensor 6 corresponds to a triggering time which triggers the marking operation for both laser devices 4, 5 of the marking station 35. In the same way, the detection of a canister 2 by the control triggering sensor 9 corresponds to a triggering time which triggers the control operation for both cameras 7, 8 of the control station 37.

In the marking station 35, the marking apparatus comprises two laser devices 4 and 5 located on both sides of the conveying path 10 and configured to emit two laser beams 44, 54 in opposite directions, transversally to the running direction $X_1$ of the conveyor, in such a way that the laser beam 44 of the laser device 4 is focused in the surface region 2A of the receptacle 2 when it passes in the marking station 35, and the laser beam 54 of the laser device 5 is focused in the surface region 2B of the receptacle 2 when it passes in the marking station 35.

Each laser device 4, 5 comprises a laser source 41, 51 coupled to a beam delivery unit 43, 53. In one embodiment, which is given only by way of example and is not limitative, each laser source 41, 51 is a diode-pumped frequency-tripled Nd:YVO4 laser emitting pulses at 355 nm, with a repetition rate of 50 kHz, a pulse width of less than 25 ns and a pulse energy of 160 μJ. Each beam delivery unit 43, 53 is configured to focus the laser beam, in the focal plane corresponding substantially to the surface region 2A or 2B to be marked, in the form of a laser spot 46, 56 having a spot diameter D of 100 μm, and to move the laser spot 46, 56 in the focal plane according to a scanning trajectory corresponding to the desired pattern 21, 22 to be marked.

To this end, the beam delivery units 43, 53 each comprise a X-scanning mirror and a Y-scanning mirror driven by galvano-scanners, configured to control beam movement respectively in the X-axis and in the Y-axis, as shown in the figures. For each laser device 4, 5, the laser beam emitted by the laser source 41, 51 is reflected by the X-scanning mirror and the Y-scanning mirror to become a scanning laser beam 44, 54, which is focused through at least one lens in the focal plane in the form of the laser spot 46, 56. It is noted that, for the marking of canisters 2 similar to that of FIG. 1, since the marked pattern 21 on the surface region 2A is different from the marked pattern 22 on the surface region 2B, the scanning trajectory for the beam delivery unit 43 of the laser device 4 is different from the scanning trajectory for the beam delivery unit 53 of the laser device 5.

The marking apparatus also comprises a controller 36 configured to monitor the laser marking in the marking station 35 by controlling the laser devices 4, 5, in particular as a function of the speed of the conveyor 1 and a triggering time determined by the marking triggering sensor 6 located upstream of the marking station 35. In practice, the laser scanning speed of each laser device 4, 5 is adapted as a function of the speed of the conveyor 1 measured by the speed sensor 12, so as to mark each of the desired patterns 21, 22 adequately on the surface regions 2A and 2B. For each surface region 2A, 2B, the laser scanning speed may vary during the marking operation, in particular the laser scanning speed is typically higher for the marking of straight lines, compared to the marking of curved lines.

The scanning speed is in a range of between 2500 mm/s and 5000 mm/s, preferably between 3000 mm/s and 4500 mm/s. For a given repetition rate of each pulsed source 41, 51, the laser scanning speed can advantageously be adapted in such a way that the ratio of the length L of the overlap zone J between two successive positions of the laser spot 46, 56 to the spot diameter D of the laser spot is higher than or equal to 0.15, preferably higher than or equal to 0.3, corresponding to the marked canister 2 shown in FIG. 1. The overlap length may be higher for curved line segments compared to straight line segments, due to a decrease in the laser scanning speed for the marking of curved line segments.

By way of example, for a repetition rate of 50 kHz of each laser source 41, 51 and a spot diameter D of 100 μm, a scanning speed of 3500 mm/s at least in straight line segments corresponds to a 70 μm movement per pulse, i.e. an overlap length L of 30 μm, i.e. a 30% overlap for each straight line segment. Another controlled parameter is the energy density in the focal plane, which is a function of the photoactive additive concentration, the pulse energy of the laser and the spot diameter D. In the example of the canisters 2 with surface regions 2A, 2B made of polyethylene with $TiO_2$ in an amount of 1 to 3 wt %, the energy density in the focal plane is selected to be higher than or equal to 1 J/cm$^2$, in order to have sufficient marking contrast, and less than or equal to 2 J/cm$^2$, in order to avoid ablating the material. More generally, the controller 36 is advantageously configured to control parameters of each laser device 4, 5 among: the focal laser spot diameter D, the laser average power, the laser scanning speed, the repetition rate, the pulse width, the marking direction, and a combination thereof.

The invention is not limited to the examples described and shown.

In particular, the receptacles may be made of a material other than a polymeric resin. For example, the or each receptacle may be an anodized aluminum can. In this case, the marking of each of the first and second surface regions of the receptacle may be performed using an infrared (IR) laser. For the marking of each surface region according to the invention, the laser source may also not be pulsed. For example, Continuous Wave (CW) or Quasi Continuous Wave (QCW) lasers may be used.

In addition, in the example of the canister described and shown in the figures, the first and second surface regions of the canister are located on the tubular body of the canister. As a variant, at least one of the first and second surface regions may be on the cap of the canister, e.g. on the periphery or on the top wall of the cap. At least one of first and second surface regions may also extend over both the body and the cap, e.g. overlapping the boundary between the two parts.

The receptacle may also be other than a canister intended to be dropped in a packaging. For example, the receptacle may be a stopper configured to close a packaging, e.g. for sensitive products. Moreover, whatever its application, the receptacle may have other shapes than a cylindrical shape as shown in the figures, e.g. the receptacle may have a tubular shape with any cross section, or a spherical shape, provided that the receptacle defines an inner volume delimited by at least one peripheral wall, and the first and second surface regions are arranged on two opposite sides of the inner volume.

Other relative orientations of the receptacle and the laser beams than those represented in the figures can also be considered, as long as the simultaneous marking of the first and second surface regions can take place. For example, it may be considered to have the laser beams oriented vertically facing one another, in the case of a receptacle with the first and second surface regions facing up and down, e.g. when the receptacle is suspended above the conveying path, or when the receptacle is moved in a lying position along the conveying path.

The invention claimed is:

1. A method for the marking of a receptacle while it is moved along a conveying path, the method comprising:

moving the receptacle in a marking station along the conveying path in a conveying direction; and simultaneously marking a first surface region and a second surface region of the receptacle while it is moved in the marking station along the conveying path, using a first laser beam and a second laser beam emitted in opposite directions on two sides of the receptacle, transversally to the conveying direction, wherein the first and second surface regions are arranged substantially at 180° from each other with respect to a main axis of the receptacle, wherein the first laser beam is emitted by a first laser device and the second laser beam is emitted by a second laser device, wherein the first and second laser devices each comprise a respective laser source, wherein each of the first and second laser beams is focused in the form of a laser spot in a focal plane corresponding to the respective surface region to be marked, wherein, in each surface region to be marked, successive laser-marked dots, arranged in lines such that a width of each line corresponds to a diameter of one laser-marked dot, are marked by moving the laser spot produced by the respective laser beam among the first and second laser beams in the focal plane according to a scanning trajectory, wherein each laser beam among the first and second laser beams is a pulsed laser beam, with a repetition rate and a laser scanning speed adapted in such a way that, during the marking of each line of laser-marked dots in the respective surface region by moving the laser spot produced by the respective laser beam, a ratio of a length of an overlap zone between two successive positions of the laser spot to a spot diameter of the laser spot is higher than or equal to 0.15.

2. The method according to claim 1, wherein the first and second laser devices are controlled by a speed at which the receptacle is moved in the marking station along the conveying path and a triggering time, which is the same for both laser devices.

3. The method according to claim 2, wherein the triggering time for both the first laser device and the second laser device is determined by a single sensor configured to detect a position of the receptacle along the conveying path.

4. The method according to claim 1, wherein, for at least one of the first and second surface regions of the receptacle, a ratio of a maximum arc length of a pattern marked on said surface region, taken in a circumferential direction of the receptable, to half a circumference of the receptacle is higher than 30%.

5. The method according to claim 1, wherein, for each of the first and second surface regions of the receptacle, the surface region comprises a polymer resin and an additive that absorbs radiation in a given wavelength range, wherein a wavelength of each of the first and second laser beams is in the given wavelength range, wherein an energy density in a focal plane for each of the first and second laser beams avoids material ablation in the corresponding surface region of the receptacle.

6. The method according to claim 1, wherein each of the first and second laser beams is focused, in a focal plane corresponding to the respective surface region to be marked, in the form of a laser spot having a spot diameter in a range of between 50 μm and 150 μm.

7. The method according to claim 1, wherein the laser spot of each of the first and second laser beams is displaced, in a focal plane corresponding to the respective surface region to be marked, according to a scanning trajectory with a scanning speed in a range of between 2500 mm/s and 5000 mm/s.

8. The method according to claim 1, comprising a step of determining, for each of the first and second surface regions of marked the receptacle to be respectively by the first and second laser beams, an optimized scanning trajectory of the laser spot corresponding to an optimized marking order of characters of a pattern to be marked which minimizes a marking time of the pattern on the respective surface region.

9. A laser-marked receptacle for use in a packaging filled with sensitive products such as food, nutraceutical products, pharmaceutical products or diagnostic products, wherein said laser-marked receptacle comprises on its outer surface two laser-marked surface regions arranged substantially at 180° from each other with respect to a main axis of the receptacle, wherein each laser-marked surface region comprises a respective marked pattern formed of a plurality of laser-marked dots resulting from a color change of material of the outer surface under the effect of a photochemical reaction induced by a laser beam, wherein, in each laser-marked surface region, the marked pattern is formed by straight and curved line segments each comprising a single row of laser-marked dots, such that a width of each line segment corresponds to a diameter of one laser-marked dot, wherein, for each line segment of each laser-marked surface region, all of the successive laser-marked dots forming the line segment are connected to each other in an overlap zone such that, for all pairs of successive laser-marked dots, a ratio of a length of the overlap zone between the two successive laser-marked dots in a longitudinal direction of the line to a diameter of each laser-marked dot is higher than or equal to 0.15, both for straight and curved line segments.

10. The laser-marked receptacle according to claim 9, wherein patterns marked on the two laser-marked surface regions of the laser-marked receptacle result from the color change of the material of the receptacle without material burning or material ablation.

11. The laser-marked receptacle according to claim 9, wherein patterns marked on the two laser-marked surface regions of the laser-marked receptacle are different from one another.

12. The laser-marked receptacle according to claim 9, wherein, for at least one pattern marked on a laser-marked surface region of the laser-marked receptacle, a ratio of a maximum arc length of the marked pattern in a circumferential direction of the receptable to half a circumference of the receptacle is higher than 30%.

13. The laser-marked receptacle according to claim 9, wherein, for each laser-marked surface region, a surface density of the laser-marked dots for the marked pattern, defined as a ratio of the number of the laser-marked dots forming the marked pattern to a surface area of the smallest circumscribing rectangle tangent to the laser-marked surface region within which the marked pattern is inscribed, is less than 300 dots/mm$^2$.

14. The laser-marked receptacle according to claim 9, wherein, for each laser-marked surface region, the number of laser-marked dots forming the marked pattern is less than 10000.

15. The laser-marked receptacle according to claim 9, wherein, in each laser-marked surface region, a diameter of each laser-marked dot is in a range of between 50 μm and 150 μm.

16. The laser-marked receptacle according to claim 9, wherein an outer surface of the laser-marked receptacle comprises a polymeric surface comprising a polymeric resin and an additive that absorbs radiation in a given wavelength range, wherein an amount of the additive is of between 0.5 and 5 wt %.

17. The laser-marked receptacle according to claim 9, wherein, for each marked pattern, the length of the overlap zone between successive laser-marked dots in a longitudinal direction of the line is higher for curved line segments compared to straight line segments.

18. An apparatus for the marking of successive receptacles in a marking station, such that in each laser-marked surface region of the laser-marked receptacles, the laser-marked dots are arranged in lines such that a width of each line corresponds to a diameter of one laser-marked dot, the apparatus comprising:

a conveyor for moving successive receptacles in the marking station along a conveying path;

a first laser device and a second laser device each comprising a respective laser source, which are located on both sides of the conveying path and configured to emit two laser beams in opposite directions, transversally to a running direction of the conveyor, wherein the laser beam of the first laser device is focused in the form of a laser spot in a first focal plane corresponding to a first surface region of a receptacle passing in the marking station, and the laser beam of the second laser device is focused in the form of a laser spot in a second focal plane corresponding to a second surface region of a receptacle passing in the marking station, wherein for each receptacle, the first and second surface regions are arranged substantially at 180° from each other with respect to a main axis of the receptacle; and a controller configured to control the first and second-laser devices as a function of a speed of the conveyor and a triggering time, wherein, in each surface region to be marked, successive laser-marked dots, arranged in lines such that a width of each line corresponds to a diameter of one laser-marked dot, are marked by moving the laser spot produced by the respective laser beam in the focal plane according to a scanning trajectory, wherein each laser beam is a pulsed laser beam, with a repetition rate and a laser scanning speed adapted in such a way that, during the marking of each line of laser-marked dots in the respective surface region by moving the laser spot produced by the respective laser beam, a ratio of a length of an overlap zone between two successive positions of the laser spot to a spot diameter of the laser spot is higher than or equal to 0.15.

19. The apparatus according to claim 18, wherein the triggering time for both laser devices is determined by a single sensor configured to detect a position of the receptacle transported by the conveyor.

20. The apparatus according to claim 18, wherein the triggering time for both laser devices is computed from a speed of the conveyor in the marking station and a spacing between successive receptacles transported by the conveyor.

21. The apparatus according to claim 18, wherein the controller is configured to control at least one laser parameter of each of the first and second laser devices selected from a group consisting of: a focal laser spot diameter, a laser average power, a laser scanning speed, a repetition rate, a pulse width, a marking direction, and a combination thereof.

* * * * *